UNITED STATES PATENT OFFICE.

ROBERT HAERING, OF NEW YORK, N. Y.

IMPROVEMENT IN VULCANIZING INDIA-RUBBER, &c.

Specification forming part of Letters Patent No. 17,037, dated April 14, 1857.

*To all whom it may concern:*

Be it known that I, ROBERT HAERING, of New York, county of New York, and State of New York, have invented certain new and useful Improvements in Vulcanizing India-Rubber and Similar Gums; and I do hereby declare that the following is a full, clear, and exact description of the same—that is to say:

It has been found hitherto impracticable to vulcanize to a high degree of hardness, as well as solidity, any very thick masses of india-rubber or gutta-percha, for the reason that the sulphur employed generates within the mass, at the temperature required, an expansive gas, which in thin sheets has an opportunity of escaping, but which in these renders the interior spongy or cellular, often causing the molds to burst while under the effect of heat; or, if secured against that, the article when removed from the mold expands largely, thereby destroying both its delicacy of form and its density. A ball or cylinder of, say, two or three inches diameter, vulcanized in the usual manner, will be found when cut through to be solid only for a short distance below the surface about one-quarter of an inch, the interior being spongy—to some extent carbonized—and when recently made emitting the odor of sulphureted gas. This defect I obviate, and also obtain a hard and equally-solid mass throughout by mixing with the matter when prepared for being vulcanized, a substance which prevents the said cellular and spongy character by absorbing the sulphurous-acid gas as fast as it is generated. The material which I have discovered to be capable of effecting this purpose is the ordinary pipe-clay, (alumine,) and I prepare the gum, therefore, for vulcanization, as follows: one pound of purified india-rubber or gutta-percha having been mixed with eight ounces of sulphur (sublimate) in the usual manner, I add to this eight ounces of alumine, taking care to have it distributed evenly throughout. This mass may now be vulcanized in from four to seven hours, at a temperature of from 230° to 300° Fahrenheit in the ordinary manner, except that as now no gas will be present to cause expansion when heated, but little pressure will be necessary upon the molds.

Articles requiring thickness, hardness, and equal solidity throughout can thus be produced, and for the aforesaid reason, that all the gases evolved by the action of the sulphur will be rapidly absorbed by the alumine or equivalent absorbing agent employed. In this manner I have been enabled to make balls of four inches diameter, which do not expand perceptibly when taken out of the mold, and which when cut are uniformly dense and compact throughout.

I claim—

In vulcanizing india-rubber and similar gums, the use of pipe-clay, (or its equivalent, for the object set forth,) in combination with sulphur, substantially in the manner and for the purpose described herein.

ROBERT HAERING.

Witnesses:
J. P. PIERSSON,
S. H. MAYNARD.